United States Patent [19]

Iida

[11] Patent Number: 5,056,133

[45] Date of Patent: Oct. 8, 1991

[54] DATA COMMUNICATION APPARATUS COUPLED TO TWO TELEPHONE LINES

[75] Inventor: Masaharu Iida, Ebina, Japan

[73] Assignee: Ricoh Company, Ltd., Tokyo, Japan

[21] Appl. No.: 384,163

[22] Filed: Jul. 24, 1989

[30] Foreign Application Priority Data

Aug. 5, 1988 [JP] Japan .................. 63-196276

[51] Int. Cl.$^5$ .......................................... H04M 11/00
[52] U.S. Cl. ...................................... 379/98; 379/100
[58] Field of Search ................. 379/93, 96, 100, 107, 379/387, 98

[56] References Cited

U.S. PATENT DOCUMENTS

| | | | |
|---|---|---|---|
| 4,464,542 | 8/1984 | Baudoin et al. | 379/387 |
| 4,524,244 | 6/1985 | Faggin et al. | 379/96 |
| 4,825,461 | 4/1989 | Kurita et al. | 379/93 |
| 4,850,008 | 7/1989 | Berg et al. | 379/93 |
| 4,868,865 | 9/1989 | Ogawa et al. | 379/100 |

FOREIGN PATENT DOCUMENTS

| | | |
|---|---|---|
| 54-21107 | 2/1979 | Japan . |
| 60-22851 | 2/1985 | Japan . |
| 61-176235 | 8/1986 | Japan . |
| 61-176236 | 8/1986 | Japan . |
| 62-65553 | 3/1987 | Japan . |

*Primary Examiner*—Jin F. Ng
*Assistant Examiner*—Ahmad F. Matar
*Attorney, Agent, or Firm*—Oblon, Spivak, McClelland, Maier & Neustadt

[57] ABSTRACT

A data communication apparatus is connected to two telephone lines and includes a single telephone circuit, a modem and a switching circuit for selectively coupling one of the telephone circuit and the modem to a selected one of the telephone lines. A telephone call is made through the telephone circuit, and a data communication such as a facsimile communication is made through the modem.

12 Claims, 4 Drawing Sheets

DATA COMMUNICATION APPARATUS COUPLED TO TWO TELEPHONE LINES

BACKGROUND OF THE INVENTION

The present invention generally relates to data communication apparatuses, and more particularly to a data communication apparatus which is connected to two telephone lines.

Recently, facsimile machines are becoming popular and there are facsimile machines which have a built-in telephone circuit so that one facsimile machine has both the functions of a telephone and a facsimile machine. In the present application, an apparatus which has the functions of the telephone and the facsimile machine is referred to as a data communication apparatus. FIG. 1 shows an example of a conventional data communication apparatus.

In FIG. 1, a data communication apparatus 1 generally comprises a switch 2, an off-hook switch 3, a ringer circuit 4, a conversation circuit 5, a handset 6, a dialer circuit 7, a ten-key 8, a controller 9, a ringing (call) detection circuit 10, a modem 11, a unit part 12, and a line protection unit 13. The off-hook switch 3, the ringer circuit 4, the conversation circuit 5 and the dialer circuit 7 constitute a telephone circuit 14.

In an initial state of the data communication apparatus 1, the switch 2 connects a telephone line L to the telephone circuit 14 and the ringing detection circuit 10, and the telephone line L is coupled to the ringer circuit 4 through the off-hook switch 3. When a ringing (call) is received through the telephone line L, the ringer circuit 4 rings a ringing element while the ringing detection circuit 10 detects the ringing and supplies a ringing (call) detection signal to the controller 9. When the ringer circuit 4 rings, an operator unhooks the handset 6 and the off-hook switch 3 connects the telephone line L to the conversation circuit 5 to enable a conversation through the handset 6. In a case where a caller is a facsimile machine, the operator pushes a start key (not shown) of the data communication apparatus 1 so that the switch 2 couples the telephone line L to the modem 11 through the line protection circuit 13 and enables a facsimile communication. When the caller simply wishes to make a conversation, the operator can make the conversation through the handset 6 by not pushing the start key.

The data communication apparatus 1 has an automatic reception mode for automatically receiving a facsimile transmission. When the ringer circuit 4 rings but the handset 6 is not unhooked for a predetermined time in a state where the data communication apparatus 1 is set to the automatic reception mode, the controller 9 supplies a switching signal to the switch 2 so as to couple the telephone line L to the modem 11 and automatically receive a facsimile communication.

When making a facsimile transmission or a telephone call, the operator unhooks the handset 6 and enters a telephone number of a destination from the ten-key 8. In this case, the dialer circuit 7 sends a dial signal to the telephone line L through the off-hook switch 3. Thereafter, the conversation can be made through the handset 6. When making the facsimile transmission, a transmission key of the data communication apparatus 1 for making a facsimile transmission is pushed prior to entering the destination telephone number from the ten-key 8. When the transmission key is pushed, the controller 9 supplies a switching signal to the switch 2 after the destination telephone number is entered so as to couple the telephone line L to the modem 11 and enable the facsimile transmission.

For the sake of convenience, the unit part 12 shown in FIG. 1 generally refers to parts of the data communication apparatus 1 other than the parts shown.

However, the conventional data communication apparatus 1 is connected to a single telephone line L and one telephone circuit 14 is required with respect to this single telephone line L. For this reason, when the data communication apparatus 1 needs to be connected to two telephone lines L, it is necessary to provide two telephone circuits 14 within the data communication apparatus 1.

FIG. 2 shows an essential part of a conventional data communication apparatus 20 which is connected to two telephone lines L1 and L2. The data communication apparatus 20 comprises a telephone circuit 21 with respect to the telephone line L1 and a telephone circuit 22 with respect to the telephone line L2. Switches 23 and 24 are controlled to connect the telephone circuit 21 to the telephone line L1 or the telephone circuit 22 to the telephone line L2 to make a telephone call. On the other hand, the switches 23, 24 and 25 are controlled to connect the modem 26 to either one of the telephone lines L1 and L2 to make a facsimile communication. However, there is a problem in that the data communication apparatus 20 becomes bulky and expensive because of the need to provide the two telephone circuits 21 and 22.

SUMMARY OF THE INVENTION

Accordingly, it is a general object of the present invention to provide a novel and useful data communication apparatus in which the problem described above is eliminated.

Another and more specific object of the present invention is to provide a data communication apparatus which is coupled to two telephone lines and includes a single telephone circuit, a modem and means for selectively coupling one of the telephone circuit and the modem to a selected one of the telephone lines. According to the data communication apparatus of the present invention, it is possible to make a telephone call and a data communication through the selected one of the telephone lines by providing only one telephone circuit. Therefore, the circuit construction of the data communication apparatus is simple and the size of the data communication apparatus is reduced effectively. As a result, it is possible to realize a compact and inexpensive data communication apparatus which is coupled to two telephone lines.

Still another object of the present invention is to provide a data communication apparatus which is coupled to two telephone lines, comprising a single telephone circuit coupled to the two telephone lines for making a telephone call, call detecting means coupled to the two telephone lines for independently detecting a call received from the two telephone lines and for outputting a call detection signal indicative of a telephone line which receives the call, modem means for transmitting and receiving data for making a data communication, switching means coupled to the telephone circuit and the switching means for coupling a selected one of the telephone circuit and the modem means to a selected one of the two telephone lines responsive to a switching signal, and control means for controlling the switching means by generating the switching signal responsive to the call detection signal received from the call detecting means. According to the data communication apparatus of the present invention, it is possible to enable a telephone call and a data communication through the selected one of the telephone lines by providing only one telephone circuit.

Other objects and further features of the present invention will be apparent from the following detailed description when read in conjunction with the accompanying drawings.

DESCRIPTION OF THE PREFERRED EMBODIMENTS

Figure 1:
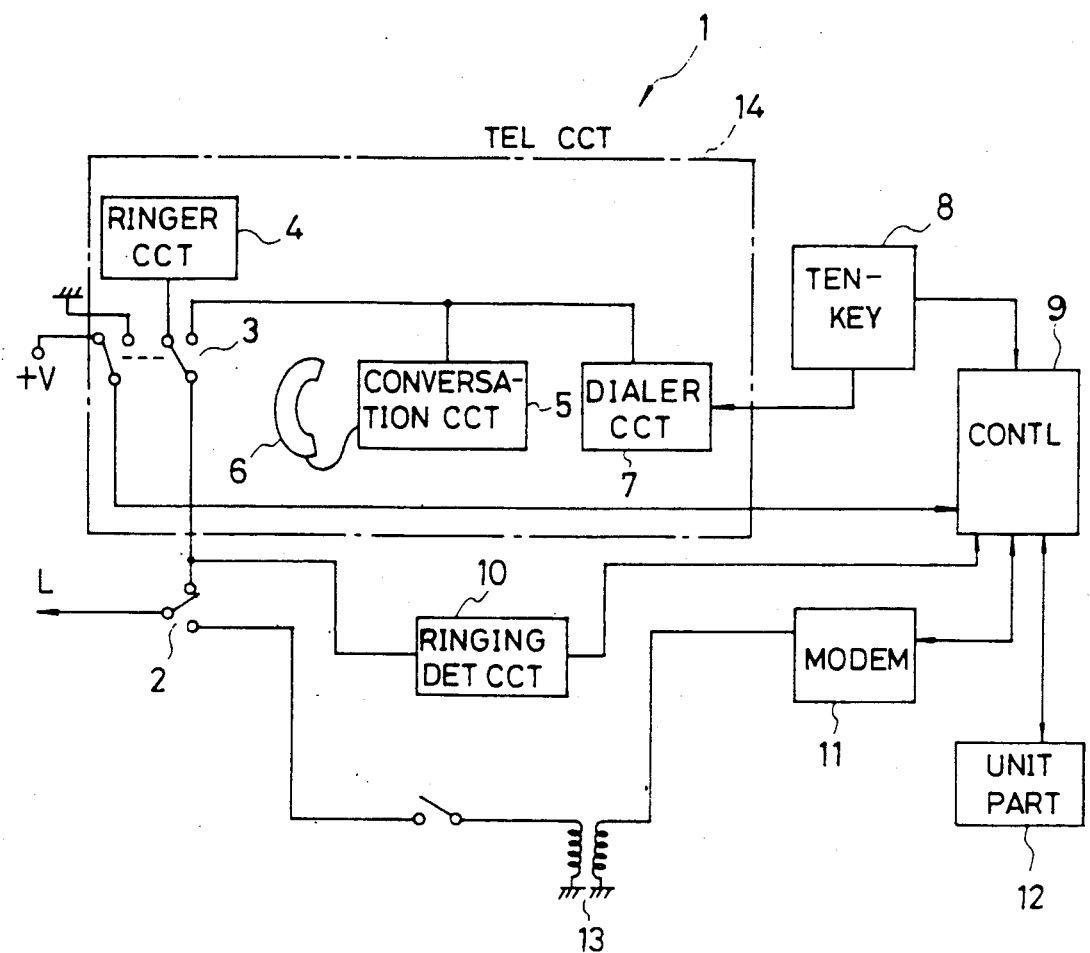
FIG. 1 is a system block diagram showing an example of a conventional data communication apparatus which is connected to one telephone line.
Figure 2:
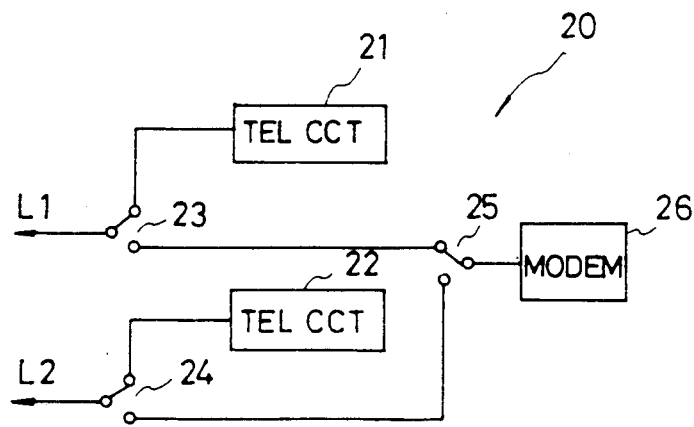
FIG. 2 is a system block diagram showing an essential part of another example of a conventional data communication apparatus which is connected to two telephone lines.
Figure 3:
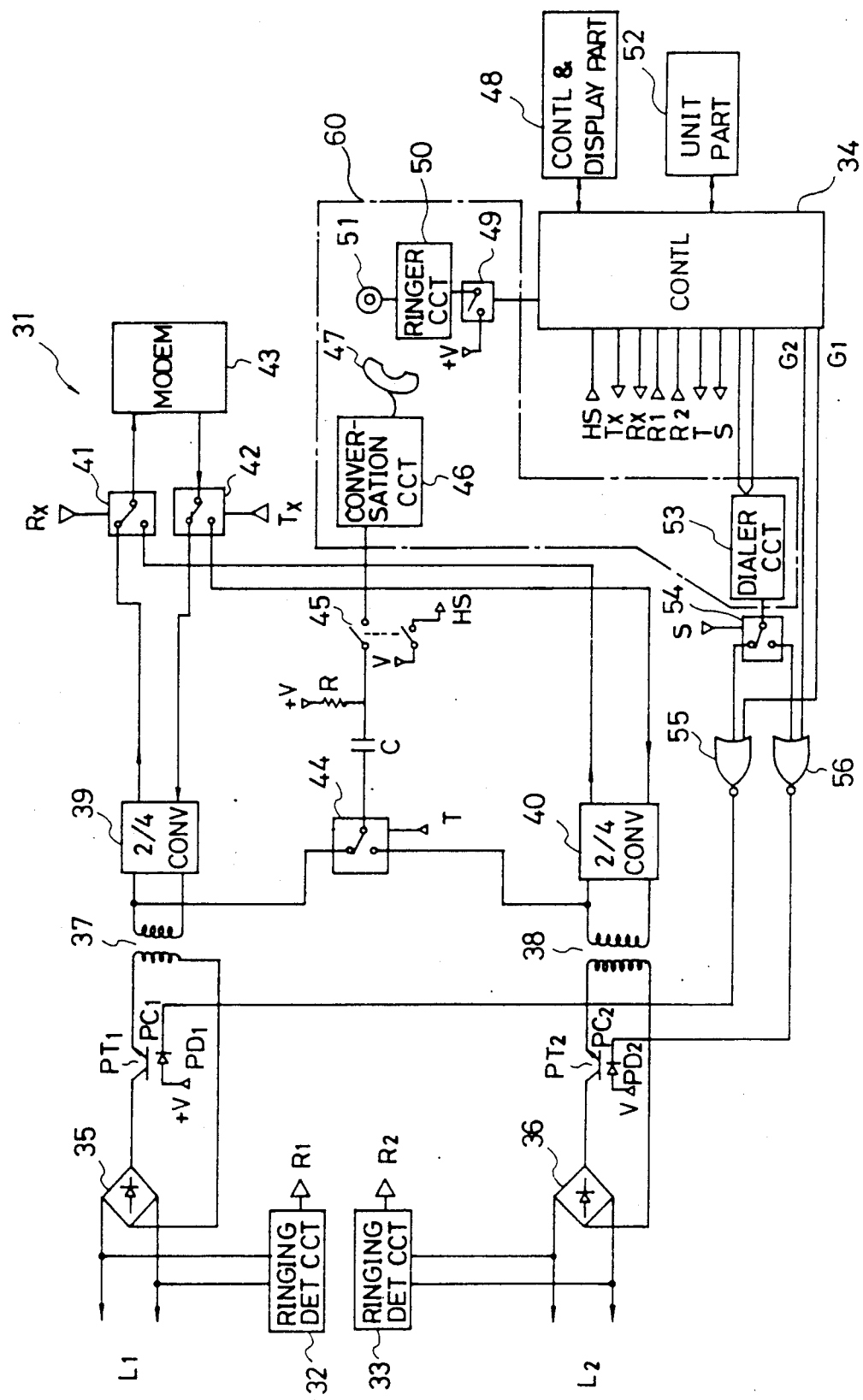
FIG. 3 is a system block diagram showing an embodiment of a data communication apparatus according to the present invention.

FIG. 3 shows an embodiment of a data communication apparatus according to the present invention. A data communication apparatus 31 is connected to two telephone lines L1 and L2. A ringing (call) detection circuit 32 is connected to the telephone line L1 and a ringing (call) detection circuit 33 is connected to the telephone line L2. The ringing detection circuits 32 and 33 detect a ringing (that is, a call) from the corresponding telephone lines L1 and L2 and output ringing detection signals R1 and R2 to a controller 34. The telephone lines L1 and L2 are respectively coupled to photocouplers PC1 and PC2 through respective bridge circuits 35 and 36. The telephone lines L1 and L2 are further coupled to respective line protection units 37 and 38. The telephone line L1 is coupled to a 2-line/4-line converter 39 through the line protection unit 37, while the telephone line L2 is coupled to a 2-line/4-line converter 40 through the line protection unit 38. The telephone lines L1 and L2 are further coupled to a modem 43 through respective switches 41 and 42. The modem 43 transmits and receives data for making a data communication such as a facsimile transmission. The switches 41 and 42 are respectively controlled by communication selection signals Rx and Tx which are output from the controller 34 so as to couple either one of the telephone lines L1 and L2 to the modem 43.

In addition, the telephone lines L1 and L2 are also coupled to a conversation switch 44 through the line protection units 37 and 38. The conversation switch 44 is coupled to a conversation circuit 46 through a capacitor C and an off-hook switch 45. A predetermined D.C. voltage +V is supplied to the conversation circuit 46 through the off-hook switch 45 and a resistor R, and a handset 47 is connected to the conversation circuit 46. The off-hook switch 45 turns ON when the handset 47 is unhooked and supplies an off-hook signal HS to the controller 34.

The conversation switch 44 is operated responsive to a conversation selection signal T received from the controller 34 and selectively connects the conversation circuit 46 to one of the telephone lines L1 and L2. A control and display part 48 is connected to the controller 34. This operation and display part 48 includes a ten-key, various keys including a key for selecting a telephone line, a display and the like. A ringer switch 49 is connected to the controller 34. When the ringer switch 49 is controlled by the controller 34 and turned ON, the ringer switch 49 supplies a power source voltage +V to a ringer circuit 50 to ring a ringing element 51. In addition, a unit part 52 is connected to the controller 34. For the sake of convenience, the unit part 52 generally refers to parts of the data communication apparatus 31 other than the parts shown, such as a scanner unit and a plotter unit.

The controller 34 controls a dialer circuit (dial signal generator) 53 to generate a dial signal. The controller 34 supplies a call selection signal S to a call switch 54 so as to select one of the telephone lines L1 and L2 to which the dial signal is sent from the dialer circuit 53. The dial signal generated from the dialer circuit 53 is supplied to a light emitting diode (LED) PD1 of a photocoupler PC1 through the call switch 54 and a NOR circuit 55 or to an LED PD2 of a photocoupler PC2 through the call switch 54 and a NOR circuit 56. The LEDs PD1 and PD2 respectively emit a light when the dial signal is received. The light emitted from the LED PD1 is supplied to a phototransistor PT1 and turns the phototransistor PT1 ON. The light emitted from the LED PD2 is supplied to a phototransistor PT2 and turn the phototransistor PT2 ON. The dial signal is sent to a selected one of the telephone lines L1 and L2 depending on ON/OFF states of the phototransistors PT1 and PT2.

In addition, the controller 34 supplies a loop signal G1 to the LED PD1 through the NOR circuit 55 and a loop signal G2 to the LED PD2 through the NOR circuit 56 to turn one of the phototransistors PT1 and PT2 ON and form a D.C. loop.

The conversation circuit 46, the ringer circuit 50 and the dialer circuit 53 constitute a telephone circuit 60.

Figure 4:
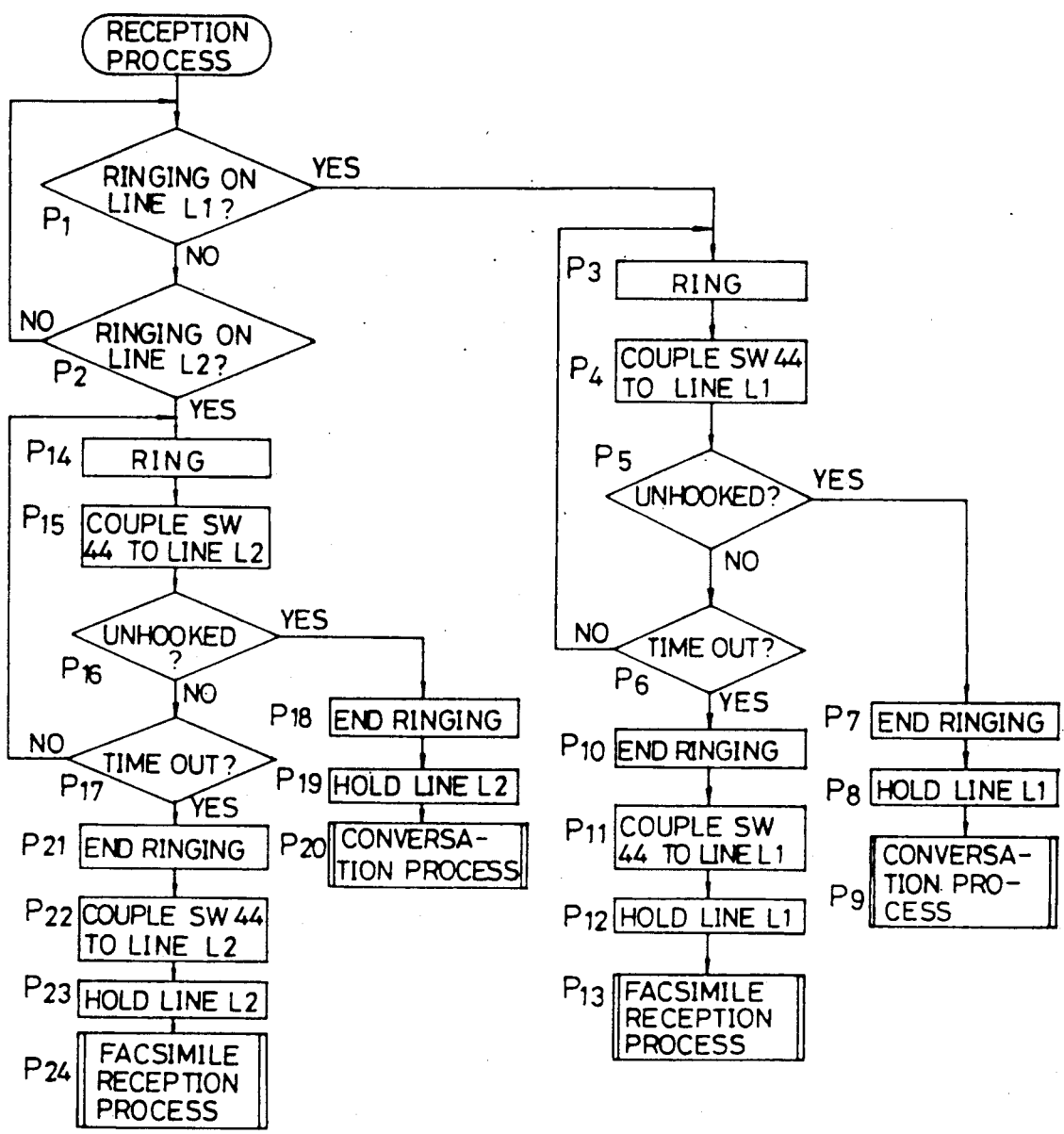
FIG. 4 is a flow chart for explaining a reception process of the embodiment.

Next, a description will be given of a reception process of the data communication apparatus 1, by referring to FIG. 4. FIG. 4 shows an operation of the controller 34 during the reception process.

In FIG. 4, a step P1 supervises the ringing detection signal R1 from the ringing detection circuit 32 and discriminates whether or not a ringing is received on the telephone line L1. When the discrimination result in the step P1 is NO, a step P2 supervises the ringing detection signal R2 from the ringing detection circuit 33 and discriminates whether or not a ringing is received from the telephone line L2. The process returns to the step P1 when the discrimination result in the step P2 is NO.

When the ringing is received from the telephone line L1 and the discrimination result in the step P1 is YES, the controller 34 receives the ringing detection signal R1 from the ringing detection circuit 32. Hence, a step P3 turns ON the ringer switch 49 and rings the ringing element 51 by the ringer circuit 50. At the same time as the ringing of the ringing element 51, a step P4 supplies the conversation selection signal T to the conversation switch 44 and couples the conversation circuit 46 to the telephone line L1. A step P5 discriminates whether or not the operator unhooks the handset 47, and a step P6 discriminates whether·or not a predetermined time has elapsed. In other words, the steps P5 and P6 discriminate whether or not the operator unhooks the handset 47 within the predetermined time.

When the handset 47 is unhooked within the predetermined time, the controller 34 receives the off-hook signal HS from the off-hook switch 45. In this case, the discrimination result in the step P5 is YES and a step P7 turns the ringer switch 49 OFF to stop the ringing. A step P8 supplies the loop signal G1 to the photocoupler PC1 and holds the telephone line L1. As a result, it becomes possible to make a conversation through the handset 47, and a step P9 thereafter carries out a normal conversation process.

On the other hand, when the handset 47 is not unhooked within the predetermined time, the discrimination result in the step P5 is NO and the discrimination result in the step P6 is YES. In this case, a step P10 turns the ringer switch 49 OFF to stop the ringing. A step P11 supplies the communication selection signals Rx and Tx to the respective switches 41 and 42 and couples the modem 43 to the telephone line L1. In addition, a step P12 supplies the loop signal G1 to the photocoupler PC1 to form a D.C. loop and holds the telephone line L1. Accordingly, the telephone line L1 is coupled to the modem 43 through the switches 41 and 42, and a step P13 thereafter carries out a normal facsimile reception process.

When a ringing is received from the telephone line L2 and the discrimination result in the step P2 is YES, the controller 34 receives the ringing detection signal R2 from the ringing detection circuit 33. Hence, a step P14 turns ON the ringer switch 49 and rings the ringing element 51 by the ringer circuit 50. At the same time as the ringing of the ringing element 51, a step P15 supplies the conversation selection signal T to the conversation switch 44 and couples the conversation circuit 46 to the telephone line L2. A step P16 discriminates whether or not the operator unhooks the handset 47, and a step P17 discriminates whether or not a predetermined time has elapsed. In other words, the steps P16 and P17 discriminate whether or not the operator unhooks the handset 47 within the predetermined time.

When the handset 47 is unhooked within the predetermined time, the controller 34 receives the off-hook signal HS from the off-hook switch 45. In this case, the discrimination result in the step P16 is YES and a step P18 turns the ringer switch 49 OFF to stop the ringing. A step P19 supplies the loop signal G2 to the photocoupler PC2 and holds the telephone line L2. As a result, it becomes possible to make a conversation through the handset 47, and a step P20 thereafter carries out a normal conversation process.

On the other hand, when the handset 47 is not unhooked within the predetermined time, the discrimination result in the step P16 is NO and the discrimination result in the step P17 is YES. In this case, a step P21 turns the ringer switch 49 OFF to stop the ringing. A step P22 supplies the communication selection signals Rx and Tx to the respective switches 41 and 42 and connects the modem 43 to the telephone line L2. In addition, a step P23 supplies the loop signal G2 to the photocoupler PC2 to form a D.C. loop and holds the telephone line L2. Accordingly, the telephone line L2 is coupled to the modem 43 through the switches 41 and 42, and a step P24 thereafter carries out a normal facsimile reception process.

Figure 5:
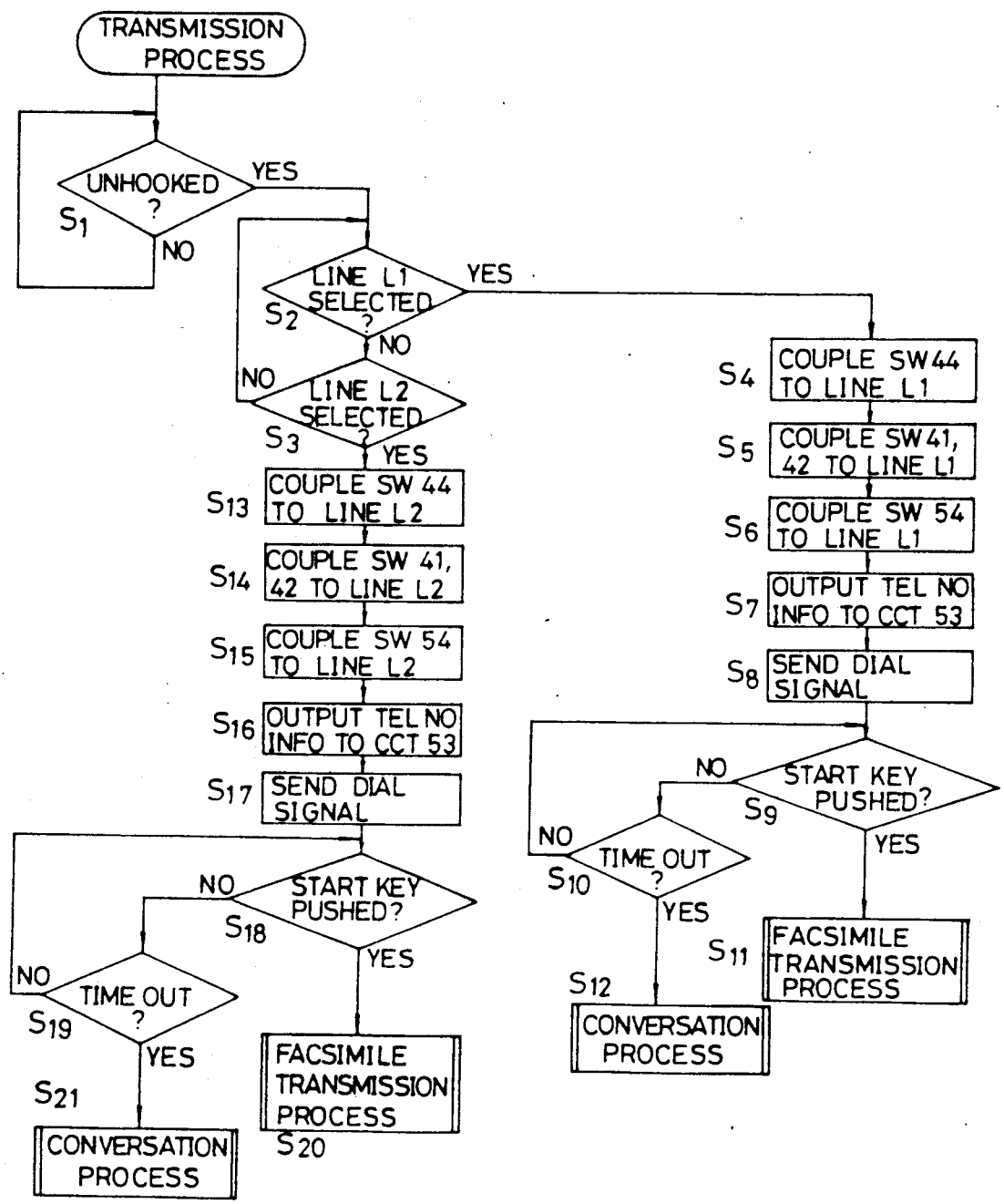
FIG. 5 is a flow chart for explaining a transmission process of the embodiment.

Next, a description will be given of a transmission process of the data communication apparatus 31, by referring to FIG. 5. FIG. 5 shows an operation of the controller 34 during the transmission process.

When making a facsimile transmission or a telephone call, the operator unhooks the handset 47, selects one of the telephone lines L1 and L2 and dials a destination telephone number by manipulating the ten-key of the control and display part 48. In FIG. 5, a step S1 discriminates whether or not the handset 47 is unhooked. When the discrimination result in the step S1 becomes YES, a step S2 discriminates whether or not the telephone line L1 is selected. When the discrimination result in the step S3 is NO, a step S3 discriminates whether or not the telephone line L2 is selected. The process returns to the step S2 when the discrimination result in the step S3 is NO.

When the telephone line L1 is selected and the discrimination result in the step S2 is YES, a step S4 supplies a conversation selection signal T to the conversation switch 44 to couple the conversation switch 44 to the telephone line L1. A step S5 supplies a communication selection signals Rx and Tx to the switches 41 and 42 to couple the switches 41 and 42 to the telephone line L1. A step S6 supplies the call selection signal S to the call switch 54 to couple the call switch 54 to the telephone line L1. A step S7 detects the destination telephone number entered from the ten-key of the control and display part 48 and supplies a telephone number information to the dialer circuit 53. A step S8 controls the dialer circuit 53 to generate a dial signal based on the telephone number information.

After the step S8, a step S9 discriminates whether or not a start key of the control and display part 48 is pushed. When the discrimination result in the step S9 is NO, a step S10 discriminates whether or not a predetermined time has elapsed. The process returns to the step S9 when the discrimination result in the step S10 is NO. In other words, the steps S9 and S10 discriminate whether or not the start key is pushed within the predetermined time. When the discrimination result in the step S9 is YES, a step S11 carries out a facsimile transmission process. On the other hand, when the start key is not pushed within the predetermined time, the discrimination result in the step S10 is YES and a step S12 carries out a conversation process to enable a conversation through the handset 47.

When the telephone line L2 is selected and the discrimination result in the step S3 is YES, a step S13 supplies a conversation selection signal T to the conversation switch 44 to couple the conversation switch 44 to the telephone line L2. A step S14 supplies a communication selection signals Rx and Tx to the switches 41 and 42 to couple the switches 41 and 42 to the telephone line L2. A step S15 supplies the call selection signal S to the call switch 54 to couple the call switch 54 to the telephone line L2. A step S16 detects the destination telephone number entered from the ten-key of the control and display part 48 and supplies a telephone number information to the dialer circuit 53. A step S17 controls the dialer circuit 53 to generate a dial signal based on the telephone number information.

After the step S17, a step S18 discriminates whether or not the start key of the control and display part 48 is pushed. When the discrimination result in the step S18 is NO, a step S19 discriminates whether or not a predetermined time has elapsed. The process returns to the step S18 when the discrimination result in the step S19 is NO. In other words, the steps S18 and S19 discriminate whether or not the start key is pushed within the predetermined time. When the discrimination result in the step S18 is YES, a step S20 carries out a facsimile transmission process. On the other hand, when the start key is not pushed within the predetermined time, the discrimination result in the step S19 is YES and a step S21 carries out a conversation process to enable a conversation through the handset 47.

Therefore, according to this embodiment, the data communication apparatus 31 which is connected to the two telephone lines L1 and L2 only requires the one telephone circuit 60 to make the telephone call and the facsimile communication through one of the telephone lines L1 and L2. In other words, only one conversation circuit 46, one ringer circuit 50 and one dialer circuit 53 are required even though the data communication apparatus 31 is connected to the two telephone lines L1 and L2. For this reason, the circuit construction of the data communication apparatus 31 is simple and the size of the data communication apparatus 31 can be reduced effectively. As a result, it is possible to realize a compact and inexpensive data communication apparatus which is coupled to two telephone lines.

Further, the present invention is not limited to these embodiments, but various variations and modifications may be made without departing from the scope of the present invention.

What is claimed is:

1. A data communication apparatus which is coupled to two telephone lines, said data communication apparatus comprising:
    a single telephone circuit coupled to the two telephone lines for making a telephone call;
    call detecting means coupled to the two telephone lines for independently detecting a call received from the two telephone lines and for outputting a call detection signal indicative of a telephone line which receives the call;
    modem means for transmitting and receiving data for making a data communications;
    switching means coupled to said telephone circuit and said modem means for coupling a selected one of said telephone circuit and said modem means to a selected one of the two telephone lines responsive to a switching signal;
    line protection means including a transformer means having primary and secondary slides wherein said primary side is coupled to said two telephone lines and wherein said secondary side is connected to said switching means and wherein said telephone circuit is provided on said secondary side of said line protection means and wherein said telephone circuit receives current from a predetermined current source means; and
    control means for controlling said switching means by generating the switching signal responsive to the called detection signal received from said call detecting means.

2. The data communication apparatus as claimed in claim 1 wherein said telephone circuit includes a handset, said control means generating a switching signal for controlling said switching means in a reception mode to couple said telephone circuit to the selected one of the two telephone lines when said handset is unhooked.

3. The data communication apparatus as claimed in claim 2 wherein said control means generates a switching signal for controlling said switching means in the reception mode to couple said modem means to the selected one of the two telephone lines when said handset remains hooked for a predetermined time.

4. The data communication apparatus as claimed in claim 1 which further comprises input means including a plurality of keys for selecting a telephone line, dialing a telephone number and starting a data communication, said control means generating said switching signal based on a control information received from said input means in a transmission mode.

5. The data communication apparatus as claimed in claim 4 wherein said telephone circuit includes a handset, said control means generating a switching signal for controlling said switching means in the transmission mode to couple said telephone circuit to the selected one of the two telephone lines when said handset is unhooked.

6. The data communication apparatus as claimed in claim 5 wherein said control means generates a switching signal for controlling said switching means in the transmission mode to couple said modem means to the selected one of the two telephone lines when a data communication start instruction is entered from said input means within a predetermined time from a time when said handset is unhooked.

7. The data communication apparatus as claimed in claim 6 wherein the telephone number is dialed from said input means after the data communication start instruction.

8. The data communication apparatus as claimed in claim 1 wherein said telephone circuit comprises a conversation circuit through which a telephone conversation is made and a dialer circuit for generating a dial signal, said conversation circuit and said dialer circuit being coupled to said switching means.

9. The data communication apparatus as claimed in claim 8 wherein said telephone circuit further comprises a ringing element and a ringing circuit for ringing said ringing element responsive to the call detection signal received from said call detecting means.

10. The data communication apparatus as claimed in claim 9 wherein said control means controls said ringing element responsive to the call detection signal received from said call detecting means.

11. The data communication apparatus as claimed in claim 8 which further comprises input means including a plurality of keys for selecting a telephone line, dialing a telephone number and starting a data communication, said control means generating said switching signal based on a control information received from said input means in a transmission mode, said control means supplying a control signal to said dialing circuit to generate a dial signal corresponding to a telephone number entered from said input means.

12. The data communication apparatus as claimed in claim 8 wherein said switching means comprises a first switch for coupling said modem means to one of the two telephone lines responsive to the switching signal, a second switch for coupling said conversation circuit to one of the two telephone lines responsive to the switching signal, and a third switch for coupling said dialer circuit to one of the two telephone lines responsive to the switching signal.

* * * * *